(12) United States Patent
Sandoval

(10) Patent No.: US 11,044,891 B2
(45) Date of Patent: Jun. 29, 2021

(54) LIVESTOCK INSECTICIDE APPLICATION SYSTEM

(71) Applicant: Christopher M. Sandoval, Hugoton, KS (US)

(72) Inventor: Christopher M. Sandoval, Hugoton, KS (US)

(*) Notice: Subject to any disclaimer, the term of this patent is extended or adjusted under 35 U.S.C. 154(b) by 498 days.

(21) Appl. No.: 16/150,528

(22) Filed: Oct. 3, 2018

(65) Prior Publication Data

US 2019/0104703 A1 Apr. 11, 2019

Related U.S. Application Data

(60) Provisional application No. 62/570,340, filed on Oct. 10, 2017.

(51) Int. Cl.
*A01K 13/00* (2006.01)
*A46B 11/00* (2006.01)

(52) U.S. Cl.
CPC ........ *A01K 13/003* (2013.01); *A46B 11/0013* (2013.01); *A46B 11/0062* (2013.01); *A46B 2200/1093* (2013.01)

(58) Field of Classification Search
CPC .............................. A01K 13/003; A01K 13/004
See application file for complete search history.

(56) References Cited

U.S. PATENT DOCUMENTS

| | | | |
|---|---|---|---|
| 2,632,063 A | 3/1953 | Peterson | |
| 2,688,950 A | 9/1954 | Kent | |
| 2,777,421 A | 1/1957 | John | |
| 2,900,957 A | 8/1959 | Peterson et al. | |
| 3,071,111 A * | 1/1963 | Hamilton | A01K 13/003 119/656 |
| 3,175,537 A * | 3/1965 | Paul | A01K 13/004 119/656 |
| 3,602,199 A * | 8/1971 | Diggs | A01K 13/003 119/667 |
| 3,919,979 A * | 11/1975 | Keene | A01K 13/004 119/656 |
| 4,987,861 A * | 1/1991 | Lemire | A01K 13/001 119/667 |
| 5,878,692 A * | 3/1999 | Ornerfors | A01K 11/006 119/14.08 |
| 5,970,911 A * | 10/1999 | van der Lely | A01J 5/0175 119/14.02 |
| 6,318,298 B1 * | 11/2001 | Nonay | A01K 13/004 119/14.18 |
| 6,966,276 B2 | 11/2005 | Dollar | |
| 7,481,184 B2 * | 1/2009 | van der Poel | A01K 13/004 119/621 |
| 9,332,730 B2 | 5/2016 | Maag | |
| 2009/0031965 A1 * | 2/2009 | Campbell | A01K 13/003 119/652 |

* cited by examiner

*Primary Examiner* — Monica L Barlow
(74) *Attorney, Agent, or Firm* — Boudwin Intellectual Property; Daniel Boudwin

(57) ABSTRACT

A system for applying an insecticide onto livestock. The system includes a gate assembly, two side brush assemblies, and an applicator assembly. During use, an animal contacts the applicator assembly, thereby causing the insecticide to exit the applicator assembly and contact the animal, where it is applied by the applicator assembly and the two side brush assemblies. The system is configured to efficiently and conveniently apply the insecticide onto the animal and reduce or eliminate a need for manually applying the insecticide onto the animal.

20 Claims, 5 Drawing Sheets

LIVESTOCK INSECTICIDE APPLICATION SYSTEM

CROSS REFERENCE TO RELATED APPLICATIONS

This application claims the benefit of U.S. Provisional Application No. 62/570,340 filed on Oct. 10, 2017. The above identified patent application is incorporated by reference herein in its entirety to provide continuity of disclosure.

BACKGROUND OF THE INVENTION

The present invention relates to a system for applying a liquid composition onto one or more animals, such as livestock, with minimal manual input.

Infection of livestock by insects carrying diseases is a significant problem in the livestock industry. It is often necessary to apply liquid compositions onto the livestock, such as cleaning agents or insecticides, to combat diseases in the livestock. These compositions are often applied manually, a process that is time-consuming, and may also be difficult or even dangerous.

Therefore, there is a need in the art for an improved system for applying a liquid composition, such as an insecticide, onto livestock. The present invention addresses this unmet need.

Systems have been disclosed in the art that relate to applying compositions onto livestock. These include systems that have been patented and published in patent application publications. However, these systems are often wasteful or inconvenient to use. In view of the systems disclosed in the art, it is submitted that there is a need in the art for an improvement to existing systems for applying compositions onto livestock. In view of the present disclosure, it is submitted that the present invention substantially diverges in structural and functional elements from devices and methods in the art, and substantially fulfills an unmet need in the art.

SUMMARY OF THE INVENTION

In view of the disadvantages inherent in the known types of livestock composition applicators in the art, the present invention provides a system for applying a liquid composition onto an animal, wherein the same can be utilized for applying a composition comprising an insecticide, a cleaning agent, or another compound for maintaining or improving a health of the animal.

It is therefore an object of the present invention to provide a system for applying a liquid composition onto an animal.

Another object of the present invention is to provide a convenient approach to applying an insecticide, a cleaning agent, or another compound to maintain or improve a health of the animal.

In one aspect, the invention provides a system for applying a liquid composition onto an animal with minimal manual input by a human. Generally, the system includes an applicator assembly, which includes an applicator tank having a plurality of apertures disposed on an upper surface thereon. The applicator tank is hollow and is configured to receive a liquid composition therein through an opening having a removable cap thereon. A lower surface of the applicator tank, located opposite or nearly opposite to the upper surface having the plurality of apertures, is adjacent to an upper surface of an applicator brush base of an applicator brush of the applicator assembly, such that a plurality of applicator brush bristles, which extend from a lower surface of the applicator brush base, are positioned downward in a direction opposite or nearly opposite to the plurality of apertures. The applicator assembly is connected by a first end thereof to a first applicator assembly vertical support and is connected by a second end thereof to a second applicator assembly vertical support, such that the first applicator assembly vertical support is parallel to the second applicator assembly vertical support. In this manner, the applicator assembly is suspended above a ground of an environment and is configured to accept the animal thereunder, thereby allowing the animal to easily contact the plurality of applicator brush bristles during use of the system.

In some embodiments, the invention provides a vertically slidable applicator assembly, such that the applicator assembly is vertically slidable along the first applicator assembly vertical support and the second assembly vertical support. The first applicator assembly vertical support may include a first applicator assembly vertical support resting member, and the second applicator assembly vertical support may include a second applicator assembly vertical support resting member. In this manner, when the applicator assembly is not pushed upward, the applicator assembly rests on the first and second applicator assembly vertical support resting members. The first and second applicator assembly vertical support resting members align with each other horizontally, forming a minimum vertical position for the applicator assembly. The minimum vertical position may be adjusted by changing a vertical position of the first and the second applicator assembly vertical support resting members. In this manner, the system can be configured for use by animals having any of a range of different heights.

In some embodiments, the applicator assembly is rotatable about a longitudinal axis of the applicator assembly. When the animal rubs a body part, such as a head, neck, or back, against the applicator brush of the applicator assembly, the applicator assembly rotates and may also slide vertically upwards. Jostling of the applicator assembly, including vertical movement, rotational movement, or a combination thereof, causes the liquid composition to exit the applicator tank through the plurality of apertures, and trickle downward, passing onto the plurality of bristles on the applicator brush and onto the animal by way of gravity.

In some embodiments, the system includes secondary applicator structures, including a first side brush and a second side brush, positioned at vertically intermediate positions of the first applicator assembly vertical support and the second applicator assembly vertical support, respectively. In this manner, as the animal rubs an upper portion of the body of the animal against the applicator brush and the liquid composition is applied to the animal, the animal may also rub one or more side portions of the body of the animal against one or both of the side brushes, thereby facilitating application of the liquid composition onto the one or more side portions of the body of the animal as the liquid composition trickles downward from the upper portion of the body of the animal onto the one or more side portions of the body of the animal. In this manner, a surface area of the body of the animal which is contacted with the liquid composition is increased.

In some embodiments, the system is free-standing, which necessitates maintaining adequate stability to withstand lateral rubbing forces from the animal using the system. The stability may be maintained by heavy duty supporting structures of the system, such as base members. Therefore, in some embodiments, the first applicator assembly vertical support is connected at a lower end thereof to a first applicator assembly vertical support base member, and the second applicator assembly vertical support is connected at a lower end thereof to a second applicator assembly vertical support base member. Maintenance of stability may also be achieved with an upper horizontal cross member, positioned above the applicator assembly, which connects the first applicator assembly vertical support to the second applicator assembly vertical support. In this manner, a free-standing system of the present invention can withstand significant rubbing forces commonly encountered by medium or large sized animals, such as bovine, and the system remains upright before, during, and after use by the animal.

Other objects, features and advantages of the present invention will become apparent from the following detailed description taken in conjunction with the accompanying drawings.

BRIEF DESCRIPTIONS OF THE DRAWINGS

Although the characteristic features of the invention will be particularly pointed out in the claims, the invention itself and manners in which it may be made and used may be better understood after a review of the following description, taken in connection with the accompanying drawings, wherein like numeral annotations are provided throughout.

DETAILED DESCRIPTION OF THE INVENTION

Figure 1:
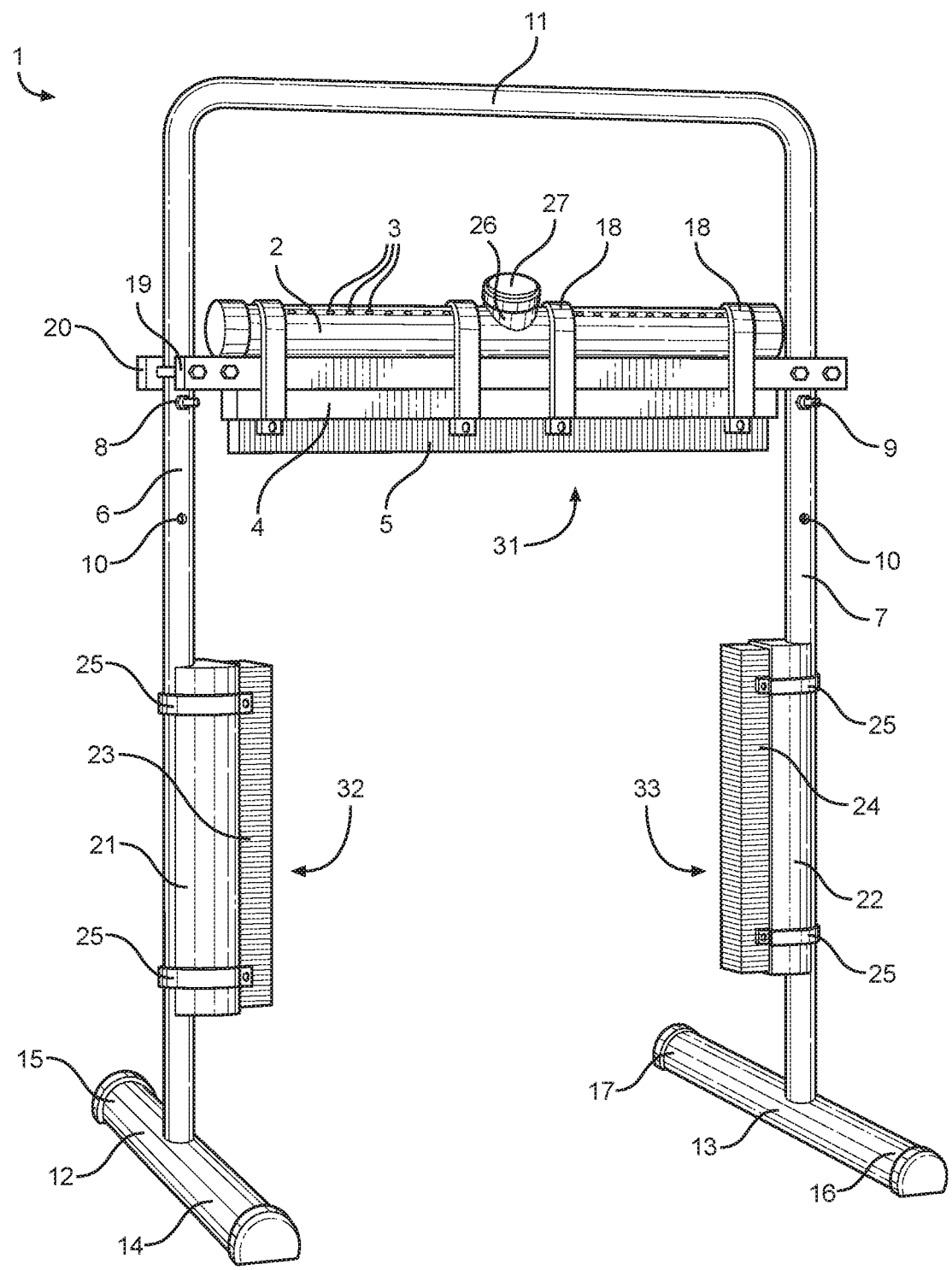
FIG. 1 depicts a perspective view of an exemplary embodiment of a liquid composition application system for livestock.

Reference is made herein to the attached drawings. Like reference numerals are used throughout the drawings to depict like or similar elements of the invention. The figures are intended for representative purposes only and should not be considered limiting in any respect.

Animals, including domesticated livestock, often rub against objects in their vicinity. The present invention provides a system for productively utilizing the rubbing behavior of livestock for maintaining or improving a health of the livestock by applying a composition to an animal when the animal rubs against one or more components of the system.

Reference is now made to the drawings, which depict one or more exemplary embodiments of the invention.

Figure 2:
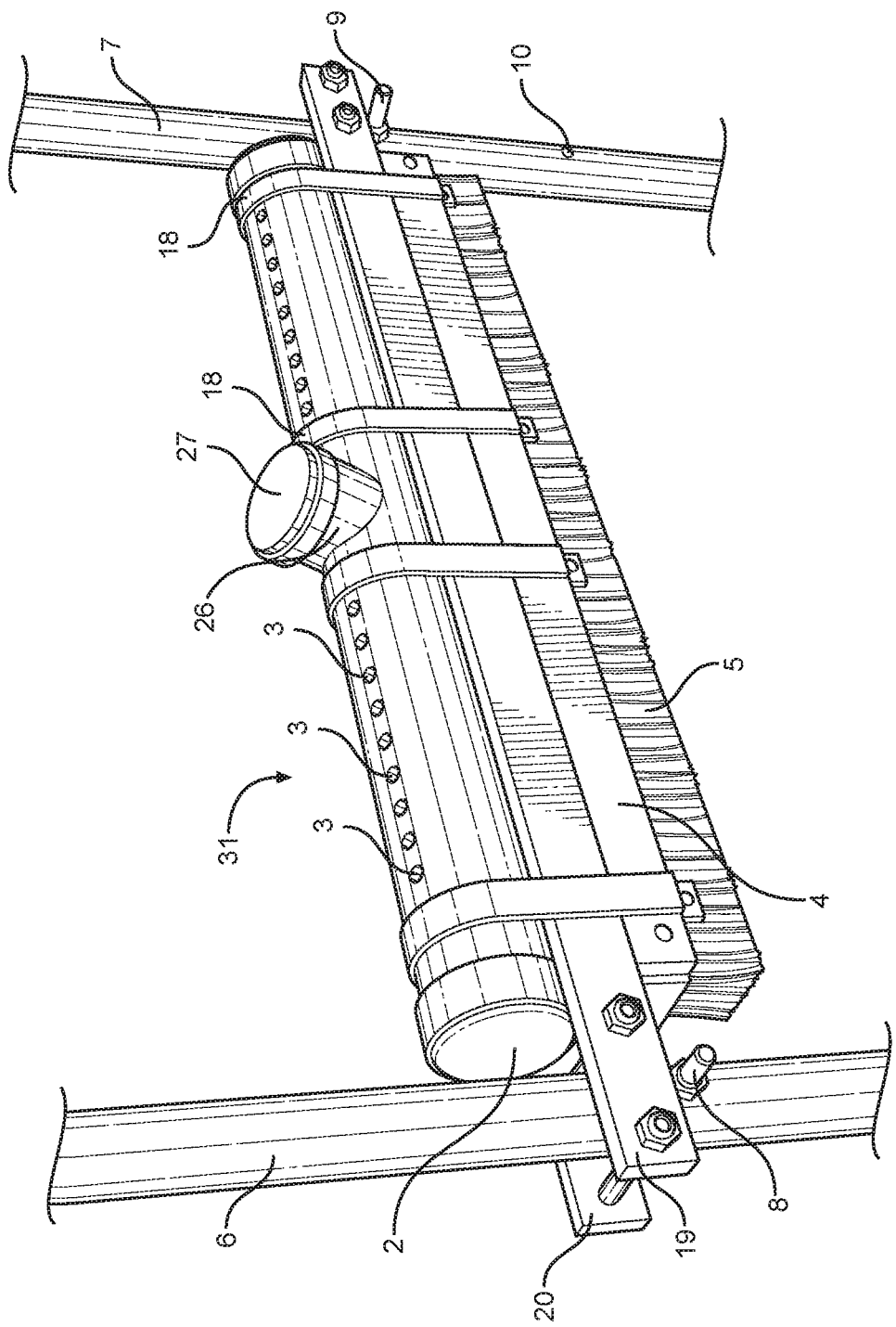
FIG. 2 depicts a close-up perspective of an applicator assembly of the exemplary embodiment of the liquid composition application system for livestock.
Figure 3:
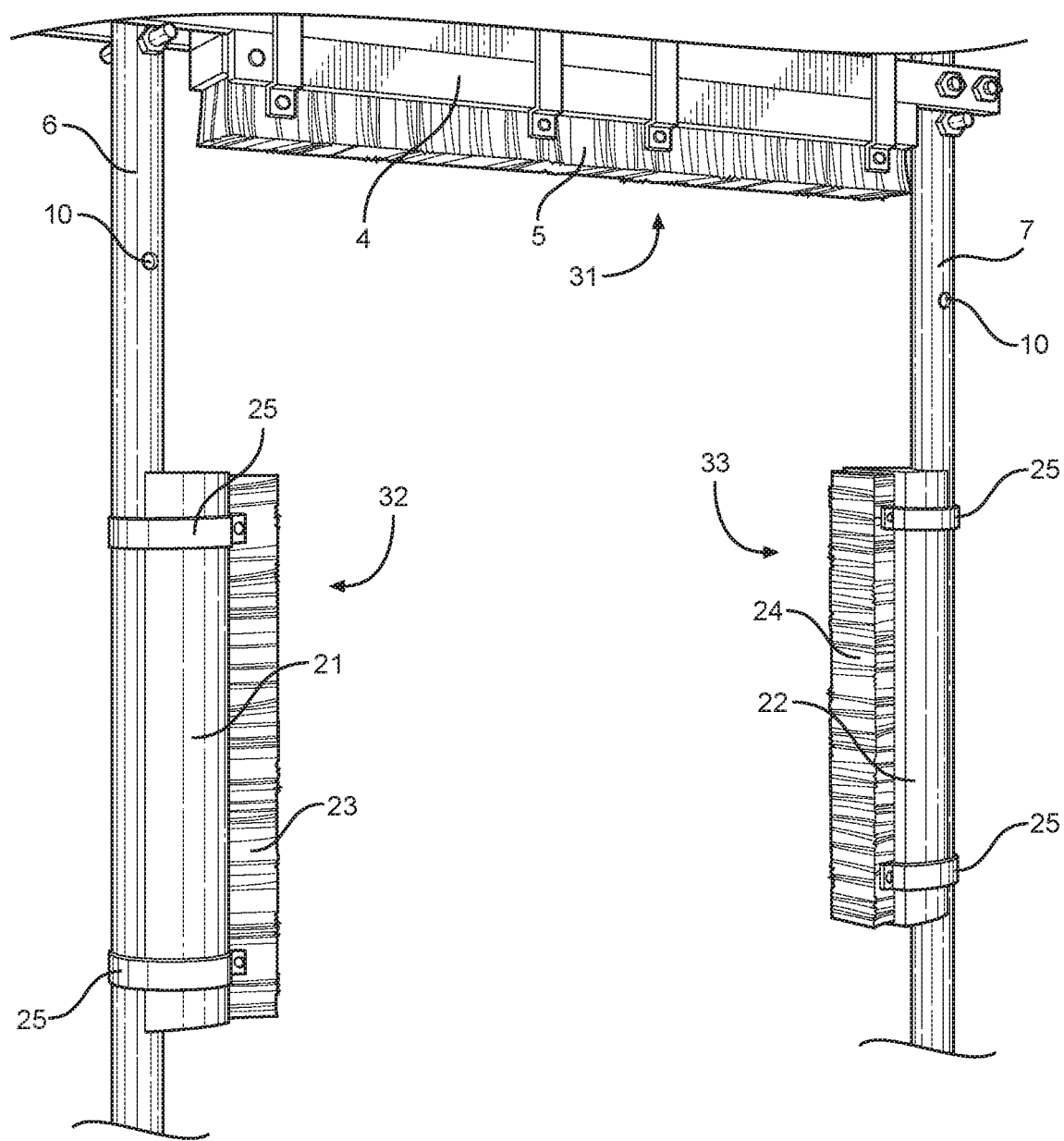
FIG. 3 depicts a close-up perspective of a brush of the applicator assembly and two side brush assemblies of the exemplary embodiment of the liquid composition application system for livestock.

Referring now to FIGS. 1-3, there are depicted several views of an exemplary embodiment of a liquid composition application system for livestock. A system 1 for applying a liquid composition onto an animal includes an applicator assembly 31. The applicator assembly 31 includes an applicator tank 2 comprising a plurality of apertures 3 disposed on an upper surface thereof, and is configured to receive, hold, and dispense the liquid composition. The applicator assembly 31 also includes an applicator brush having an applicator brush base 4 having a plurality of applicator brush bristles 5 extending from a lower surface of the applicator brush base 4. The applicator brush is disposed below the applicator tank 2, such that the applicator brush base 4 is proximal to the applicator tank 2, and such that the applicator brush bristles 5 are distal to the applicator tank 2. The applicator assembly 31 is connected at a first end thereof to a first applicator assembly vertical support 6 and is connected at a second end thereof to a second applicator assembly vertical support 7. The first applicator assembly vertical support 6 is oriented parallel to the second applicator assembly vertical support 7.

In some embodiments, the applicator assembly 31 is vertically slidable along the first applicator assembly vertical support 6 and the second assembly vertical support 7. In this manner, a vertical jostling of the applicator assembly 31 during use by the animal can cause the system to apply a greater amount of the liquid composition onto the animal compared to a system without this feature, and importantly, the system 1 is able to accept a variety of differently-sized animals therethrough, thereby maximizing a utility of the system 1.

In some embodiments, the first applicator assembly vertical support 6 includes a first applicator assembly vertical support resting member 8, and the second applicator assembly vertical support 7 includes a second applicator assembly vertical support resting member 9. The applicator assembly 31 rests on the first applicator assembly vertical support resting member 8, and also rests on the second applicator assembly vertical support resting member 9. In this manner, the resting members (8, 9) provide a minimum height at which the applicator assembly is positioned, to ensure that the animal can position itself beneath the applicator assembly 31 and use the system 1. In some embodiments, this is achieved by the first applicator assembly vertical support resting member 8 extending outward from the first applicator assembly vertical support 6, and the second applicator assembly vertical support resting member 9 extending outward from the second applicator assembly vertical support 7. In some embodiments, a vertical position of the first applicator assembly vertical support resting member 8 is adjustable by placing the first applicator assembly vertical support resting member 8 into any of a plurality of receiving holes 10 located on the first applicator assembly vertical support 6, and a vertical position of the second applicator assembly vertical support resting member 9 is adjustable by placing the second applicator assembly vertical support resting member 9 into any of a plurality of receiving holes 10 located on the second applicator assembly vertical support 7. Each of the first applicator assembly vertical support plurality of holes aligns horizontally with a corresponding hole of the second applicator assembly vertical support plurality of holes. In this manner, the applicator assembly 31 can be positioned vertically to accept the animal thereunder, and is level or nearly level with the ground of the environment when resting on the resting members (8, 9).

In some embodiments, the applicator assembly 31 is rotatable about a longitudinal axis of the applicator assembly 31. Generally, the longitudinal axis of the applicator assembly 31 runs through a pivotal center of the applicator assembly 31, is parallel to the applicator assembly 31, and is perpendicular to the first applicator assembly vertical support 6 and the second applicator assembly vertical support 7. A rotatable range of the applicator assembly 31 may be limited by two or more stops disposed on at least one selected from the group including: the first applicator assembly vertical support 6, the second applicator assembly vertical support 7, and a combination thereof. Alternatively, or in addition, the applicator assembly 31 may be biased to a default resting position by a weight disposed on the lower surface of the applicator tank 2. Alternatively, or in addition, the applicator assembly 31 may be biased to the default resting position by a spring disposed on the applicator tank 2. Generally, the default resting position is as depicted in FIGS. 1-3, wherein the applicatory brush bristles 5 are pointing downward, and wherein the applicator tank 2 is pointing upward. In some embodiments, the applicator assembly 31 is laterally movable, along the longitudinal axis, to a certain degree, to allow some play in an overall movable range of the applicator assembly 31, which improves a durability of the system 1. In some embodiments, the applicator assembly 31 is rotatable about a perpendicular axis, such that the perpendicular axis runs through a center of the applicator assembly 31 in a direction perpendicular to the longitudinal axis, which also improves the durability of the system 1.

In some embodiments, the stability of the system 1 is improved or maintained by the inclusion of an upper horizontal cross member 11, positioned above the applicator assembly 31, that connects the first applicator assembly vertical support 6 to the second applicator assembly vertical support 7. In this manner, a position or orientation of the first applicator assembly vertical support 6 relative to the second applicator assembly vertical support 7 is maintained before, during, and after use by the animal. The upper horizontal cross member 11 may be oriented parallel to the applicator assembly 31, according to the shown embodiment.

In some embodiments, the system 1 is free-standing. In some embodiments, additional structure is included to improve or maintain the stability of the system 1. The first applicator assembly vertical support 6 may be connected at a lower end thereof to a first applicator assembly vertical support base member 12, and the second applicator assembly vertical support 7 may be connected at a lower end thereof to a second applicator assembly vertical support base member 13. The base members (12, 13) may be constructed of heavy and durable materials. In this manner, the stability of the system 1 is improved or maintained when free-standing, and the system 1 is prevented from rocking or tipping before, during, and after use by the animal. The first applicator assembly vertical support base member 12 may include a forward portion 14 extending perpendicularly from a plane that includes the first applicator assembly vertical support 6 and the second applicator assembly vertical support 7, and the first applicator assembly vertical support base member 12 may include a rearward portion 15 extending perpendicularly from the plane, such that the forward portion 14 extends opposite from the rearward portion 15. The second applicator assembly vertical support base member 13 may also include a forward portion 16 extending perpendicularly from the plane, and the second applicator assembly vertical support base member 13 may include a rearward portion 17 extending perpendicularly from the plane, such that the forward portion 16 extends opposite from the rearward portion 17. To further improve the stability of the system 1, the first applicator assembly vertical support base member forward portion 14, the first applicator assembly vertical support base member rearward portion 15, the second applicator assembly vertical support base member forward portion 16, and the second applicator assembly vertical support base member rearward portion 17 may be oriented parallel and co-planar to each other, according to the shown embodiment. To further improve the stability of the system 1, a lower surface of the first applicator assembly vertical support base member 12 may be flat, and a lower surface of the second applicator assembly vertical support base member 13 may be flat, according to the shown embodiment.

In some embodiments, the applicator brush is secured below the applicator tank 2 by a plurality of straps 18. In this manner, an orientation of the applicator brush relative to the applicator tank 2 is constant or almost constant, thereby ensuring consistent delivery of the liquid composition to the animal during use. In addition, in this manner, the applicator assembly 31 may be disassembled for maintenance, cleaning, or for changing the bristles 5 thereon. In some embodiments, the bristles 5 are formed of polyethylene, or another material resistant to degradation by exposure to liquid compositions. In some embodiments, the bristles 5 are 20,000 gauge, or an equivalent gauge as appropriate for the intended application.

In some embodiments, an additional structure is utilized to attach the applicator assembly to the vertical supports (6, 7). To achieve this, an upper surface of the applicator brush base 4 may be secured to a lower surface of a forward applicator assembly cross member 19 and a lower surface of a rearward applicator assembly cross member 20, and a lower surface of the applicator tank 2 may be secured to an upper surface of the forward applicator assembly cross member 19 and an upper surface of the rearward applicator assembly cross member 20, and the forward applicator assembly cross member 19 may be attached to the rearward applicator assembly cross member 20. The forward applicator assembly cross member 19 may be parallel to the rearward applicator assembly cross member 20. In addition, the cross members (19, 20) may be slidably disposed on the first applicator assembly vertical support 6 and the second applicator assembly vertical support 7. In this manner, the cross members (19, 20) ensure that the applicator tank 2 is sufficiently supported and the applicator brush 5 is secured to the applicator tank 2 before, during, and after use by the animal. To further improve support of the applicator tank 2 and the applicator brush 5, the applicator brush base 4, the forward applicator assembly cross member 19, the rearward applicator assembly cross member 20, and the applicator tank 2 may each be oriented parallel to each other.

To improve coverage of the animal with the liquid composition, additional brushes may be included in the system 1. The additional brushes may include a first side brush assembly 32, and a second side brush assembly 33. In some embodiments, the first applicator assembly vertical support 6 is connected at a vertically intermediate portion thereof to an outer surface of a first side brush base 21, and the second applicator assembly vertical support 7 is connected at a vertically intermediate portion thereof to an outer surface of a second side brush base 22. Generally, the vertically intermediate portions of the first applicator assembly vertical support 6 and the second applicator assembly vertical support 7 are positioned between the applicator assembly 31 and the ground of the environment. The first side brush base 21 includes a plurality of bristles 23 extending from an inner surface of the first side brush base 21, and the second side brush base 22 includes a plurality of bristles 24 extending from an inner surface of the second side brush base 22. For ease of use of the system 1 by the animal, the first applicator assembly vertical support 6, the second applicator assembly vertical support 7, the first side brush base 21, and the second side brush base 22 each may be oriented parallel and co-planar to each other. In this manner, an area of the side or sides of the animal that is covered by the liquid composition during use of the system 1 is maximized, because during use of the system 1, the animal rubs on both the applicator brush 5, as well as the side brush assemblies (i.e., the first side brush base 21 with bristles 23, and the second side brush base 22 with bristles 24). In some embodiments, the first side brush base 21 and the second side brush base 22 are attached to the first applicator assembly vertical support 6 and the second applicator assembly vertical support 7, respectively, by a plurality of straps 25. In this manner, the side brush assemblies (32, 33) may be disassembled for maintenance, cleaning, or for changing the bristles (23, 24) thereon. In some embodiments, the bristles (23, 24) are formed of polyethylene, or another material resistant to degradation by exposure to liquid compositions. In some embodiments, the bristles (23, 24) are 20,000 gauge, or an equivalent gauge as appropriate for the intended application.

In some embodiments, the applicator tank 2 includes an applicator tank nozzle 26 with an applicator tank nozzle lid 27 removably disposed thereon. A diameter of the applicator tank nozzle 26 may be sized to receive the liquid composition therethrough and is generally larger than a diameter of each of the plurality of apertures 3. In this manner, the applicator tank 2 may be easily refilled by an individual to minimize a time in which the liquid composition is unavailable to the animal.

In some embodiments, the applicator brush base 4 includes a plurality of apertures therethrough, configured to channel the liquid composition to the applicator brush bristles 5 during use of the system 1 by the animal. During use of these embodiments by the animal, the liquid composition trickles out of the plurality of apertures 3 of the applicator tank 2, down one or more sides of the applicator tank 2, and onto the upper surface of the applicator brush base 4. From the upper surface of the applicator brush base 4, the liquid composition passes through the plurality of apertures of the applicator brush base 4, where it is applied to the applicator brush bristles 5, thereby saturating the applicator brush bristles 5 with the liquid composition. In this manner, the liquid composition is guided down a length of the applicator brush bristles 5, through hair of a hide of the animal, and onto the skin of the animal, thereby maximizing penetration of the liquid composition through the hair of the hide of the animal and ensuring effectiveness of the liquid composition. In the shown embodiment, the applicator tank 2 is cylindrical, which helps channel the liquid composition to the plurality of apertures of the applicator brush base 4 during use of the system 1.

Figure 4:
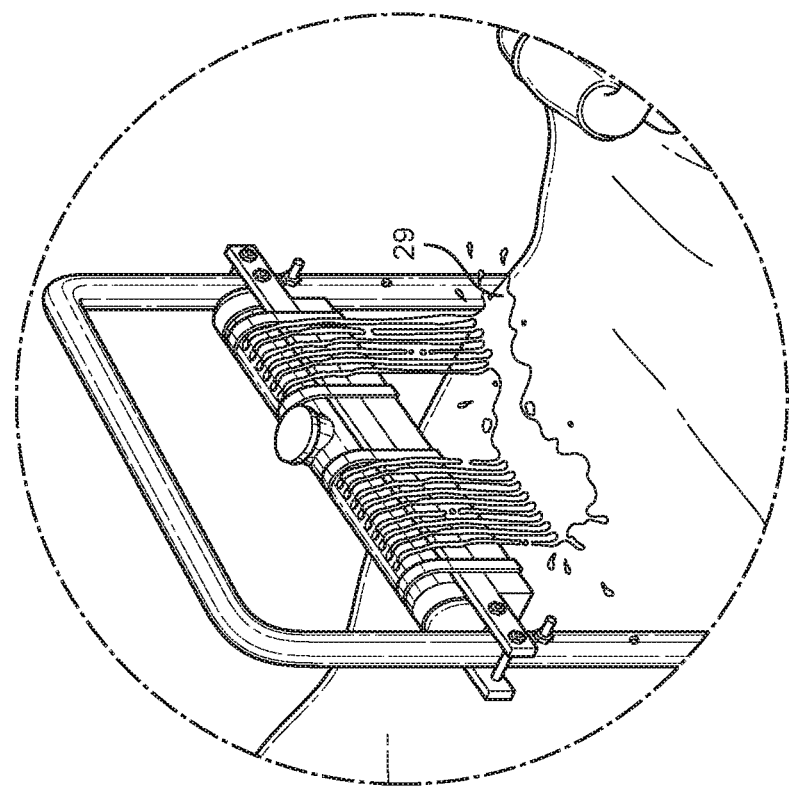
FIG. 4 depicts a perspective view of the exemplary embodiment of the liquid composition application system for livestock in use by a larger bovine animal.
Figure 4:
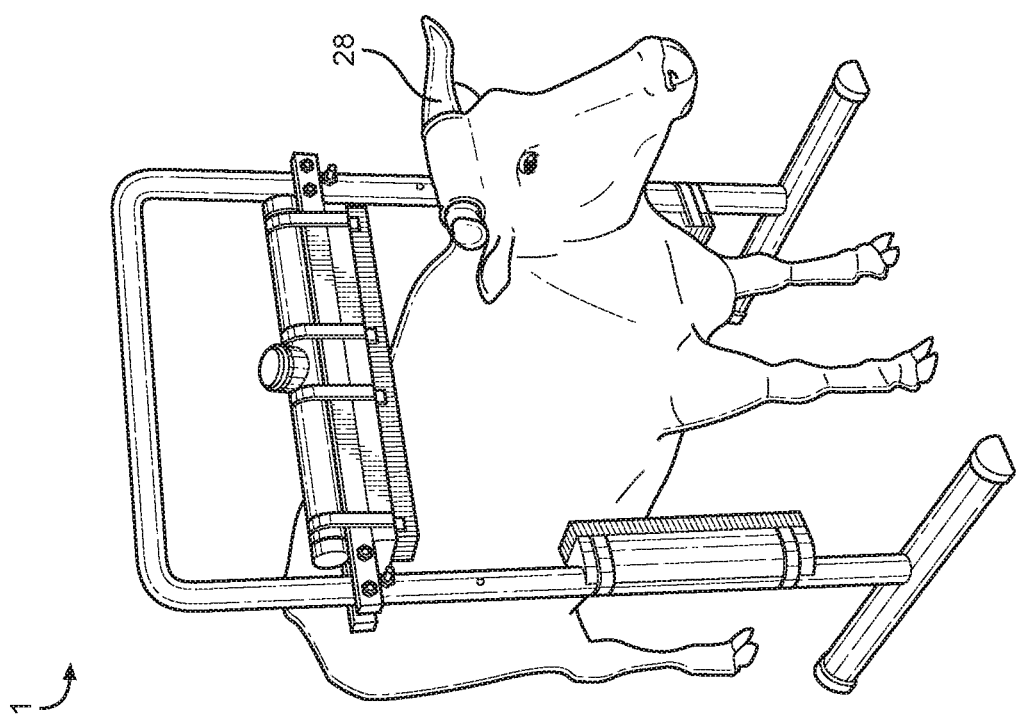

Referring now to FIG. 4, there is depicted a perspective view of the exemplary embodiment of the liquid composition application system for livestock in use by a larger bovine animal. In the shown embodiment, the system 1 is configured for use by a larger bovine animal 28 by placing a liquid composition 29 into the tank and positioning the applicator assembly at a higher position by adjusting a vertical position of the resting members. In the shown embodiment, the larger bovine animal 28 is rubbing against the applicator brush bristles, thereby jostling the applicator tank and causing the liquid composition 29 to exit the tank through the plurality of apertures thereon, whereupon the liquid composition 29 is applied to the larger bovine animal 28.

Figure 5:
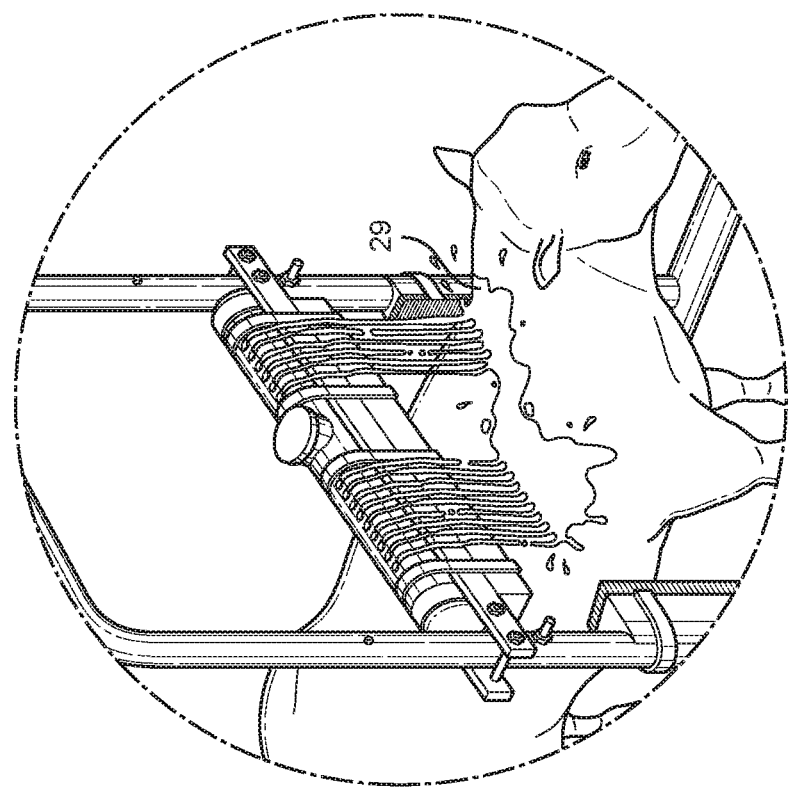
FIG. 5 depicts a perspective view of the exemplary embodiment of the liquid composition application system for livestock in use by a smaller bovine animal, illustrating a vertical adjustment of the applicator assembly to accompany the smaller bovine animal.
Figure 5:
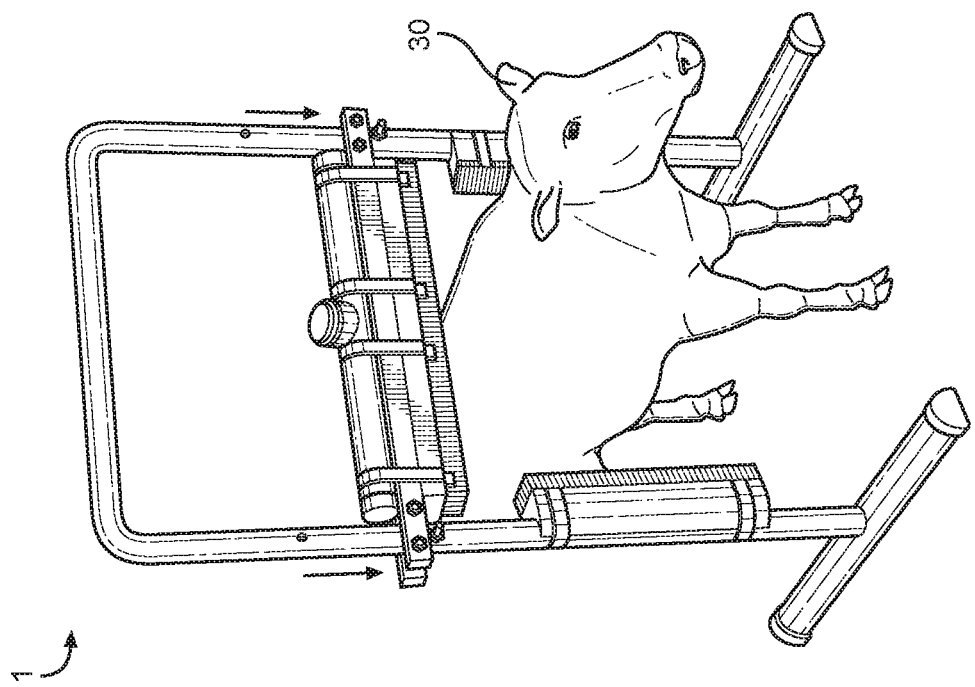

Referring now to FIG. 5, there is depicted a perspective view of the exemplary embodiment of the liquid composition application system for livestock in use by a smaller bovine animal, illustrating a vertical adjustment of the applicator assembly to accompany the smaller bovine animal. In the shown embodiment, the system 1 is configured for use by a smaller bovine animal 30 by placing the liquid composition 29 into the tank and positioning the applicator assembly at a lower position by adjusting the vertical position of the resting members. In the shown embodiment, the smaller bovine animal 30 is rubbing against the applicator brush bristles, thereby jostling the applicator tank and causing the liquid composition 29 to exit the tank through the plurality of apertures thereon, whereupon the liquid composition 29 is applied to the smaller bovine animal 30.

The foregoing descriptions of specific embodiments of the present invention have been presented for purposes of illustration and description. They are not intended to be exhaustive or to limit the present invention to the precise forms disclosed, and modifications and variations are possible in view of the above teaching. The exemplary embodiment was chosen and described to best explain the principles of the present invention and its practical application, to thereby enable others skilled in the art to best utilize the present invention and its embodiments with modifications as suited to the use contemplated.

It is therefore submitted that the present invention has been shown and described in the most practical and exemplary embodiments. It should be recognized that departures may be made which fall within the scope of the invention. With respect to the description provided herein, it is submitted that the optimal features of the invention include variations in size, materials, shape, form, function and manner of operation, assembly, and use. All structures, functions, and relationships equivalent or essentially equivalent to those disclosed are intended to be encompassed by the present invention.

I claim:

1. A system for applying a liquid composition onto an animal, comprising:
   an applicator assembly, having:
      an applicator tank having a plurality of apertures disposed on an upper surface of the applicator tank, wherein the applicator tank is configured to receive, hold, and dispense the liquid composition;
      an applicator brush having an applicator brush base with a plurality of applicator brush bristles that extends outward from a lower surface of the applicator brush base;
      wherein the applicator brush is disposed below the applicator tank, such that the applicator brush base is proximal to the applicator tank relative to the applicator brush bristles;
   wherein the applicator assembly is connected at a first end thereof to a first applicator assembly vertical support;
   wherein the applicator assembly is connected at a second end thereof to a second applicator assembly vertical support;
   wherein the first applicator assembly vertical support is oriented parallel to the second applicator assembly vertical support.

2. The system of claim 1, wherein the applicator assembly is vertically slidable along the first applicator assembly vertical support and the second applicator assembly vertical support.

3. The system of claim 2, wherein the first applicator assembly vertical support includes a first applicator assembly vertical support resting member, wherein the second applicator assembly vertical support includes a second applicator assembly vertical support resting member, wherein the applicator assembly rests on the first applicator assembly vertical support resting member and the second applicator assembly vertical support resting member.

4. The system of claim 3, wherein the first applicator assembly vertical support resting member extends outward from the first applicator assembly vertical support, wherein the second applicator assembly vertical support resting member extends outward from the second applicator assembly vertical support.

5. The system of claim 4, wherein a vertical position of the first applicator assembly vertical support resting member is adjustable by selective placement of the first applicator assembly vertical support resting member into any one of a plurality of receiving holes located on the first applicator assembly vertical support, wherein a vertical position of the second applicator assembly vertical support resting member is adjustable by selective placement of the second applicator assembly vertical support resting member into any one of a plurality of receiving holes located on the second applicator assembly vertical support, wherein each of the first applicator assembly vertical support plurality of holes horizontally aligns with a corresponding hole of the second applicator assembly vertical support plurality of holes.

6. The system of claim 1, wherein the applicator assembly is rotatable about a longitudinal axis of the applicator assembly, wherein the longitudinal axis is perpendicular to the first applicator assembly vertical support and the second applicator assembly vertical support.

7. The system of claim 6, wherein a rotatable range of the applicator assembly is defined by two or more stops disposed on at least one selected from a group consisting of: the first applicator assembly vertical support, the second applicator assembly vertical support, and a combination thereof.

8. The system of claim 6, wherein the applicator assembly is biased to a default resting position by a weight disposed on the lower surface of the applicator tank.

9. The system of claim 6, wherein the applicator assembly is biased to a default resting position by a spring disposed on the applicator tank.

10. The system of claim 1, wherein the first applicator assembly vertical support is connected to the second applicator assembly vertical support by an upper horizontal cross member disposed above the applicator assembly.

11. The system of claim 10, wherein the upper horizontal cross member is oriented parallel to the applicator assembly.

12. The system of claim 1, wherein the first applicator assembly vertical support is connected at a lower end thereof to a first applicator assembly vertical support base member, wherein the second applicator assembly vertical support is connected at a lower end thereof to a second applicator assembly vertical support base member.

13. The system of claim 12, wherein the first applicator assembly vertical support base member includes a forward portion and a rearward portion that extend in opposite directions to each other and perpendicularly from a plane that includes the first applicator assembly vertical support and the second applicator assembly vertical support, wherein the second applicator assembly vertical support base member includes a forward portion and a rearward portion that extend in opposite directions to each other and perpendicularly from the plane.

14. The system of claim 13, wherein the first applicator assembly vertical support base member forward portion, the first applicator assembly vertical support base member rearward portion, the second applicator assembly vertical support base member forward portion, and the second applicator assembly vertical support base member rearward portion are each oriented parallel and co-planar to each other.

15. The system of claim 12, wherein a lower surface of the first applicator assembly vertical support base member is flat, wherein a lower surface of the second applicator assembly vertical support base member is flat.

16. The system of claim 1, wherein the applicator brush is secured below the applicator tank by a plurality of straps.

17. The system of claim 1, wherein an upper surface of the applicator brush base is secured to a lower surface of a forward applicator assembly cross member and a lower surface of a rearward applicator assembly cross member, wherein a lower surface of the applicator tank is secured to an upper surface of the forward applicator assembly cross member and an upper surface of the rearward applicator assembly cross member, wherein the forward applicator assembly cross member is attached to the rearward applicator assembly cross member.

18. The system of claim 17, wherein the applicator brush base, the forward applicator assembly cross member, the rearward applicator assembly cross member, and the applicator tank are each oriented parallel to each other.

19. The system of claim 1, wherein the first applicator assembly vertical support is connected at a vertically intermediate portion thereof to an outer surface of a first side brush base, wherein the second applicator assembly vertical support is connected at a vertically intermediate portion thereof to an outer surface of a second side brush base, wherein the first side brush base includes a plurality of bristles that extends from an inner surface of the first side brush base, wherein the second side brush base includes a plurality of bristles that extends from an inner surface of the second side brush base.

20. The system of claim 19, wherein the first applicator assembly vertical support, the second applicator assembly vertical support, the first side brush base, and the second side brush base are each oriented parallel and co-planar to each other.

* * * * *